April 29, 1958     R. B. MATTHEWS     2,832,364
FLOW CONTROL DEVICES
Filed Sept. 21, 1955
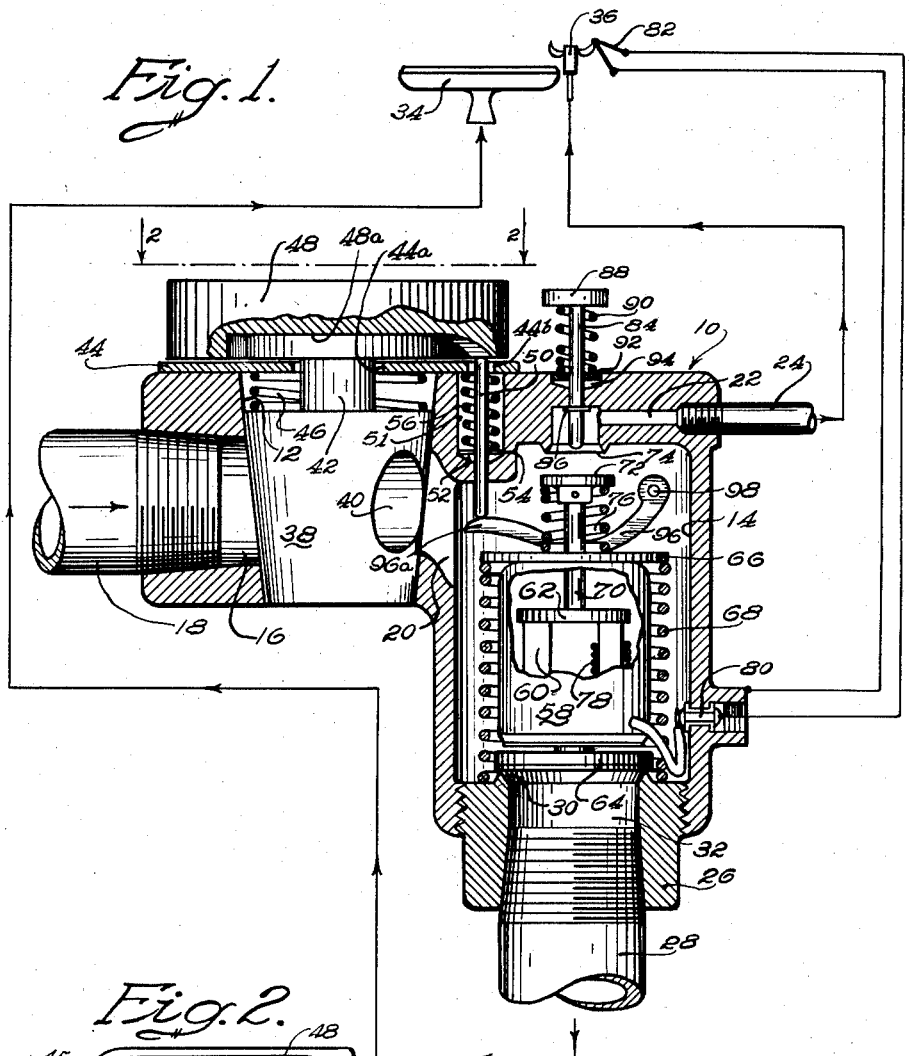
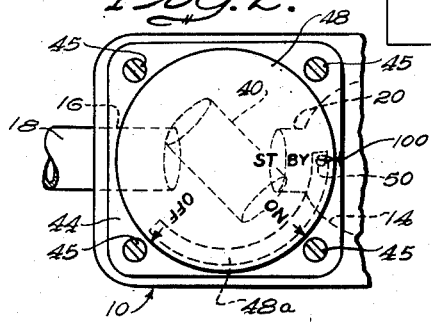
INVENTOR.
Russell B. Matthews
BY Seegert & Schwalbach
Attys United States Patent Office 2,832,364
Patented Apr. 29, 1958

2,832,364

FLOW CONTROL DEVICES

Russell B. Matthews, Wauwatosa, Wis., assignor to Baso Inc., Milwaukee, Wis., a corporation of Wisconsin Application September 21, 1955, Serial No. 535,704

20 Claims. (Cl. 137—66)

This invention relates, in general, to apparatus for controlling fluid flow and, more particularly, to safety shut-off devices for fluid fuel burning apparatus having a main burner and an ignition burner.

While the present invention is shown and herein described as comprising a pair of fluid flow control valves operable in separate fluid passages, it is to be understood that the invention is not, in its broader aspects, limited to this particular embodiment but may be employed for controlling other fluid flow controlling members and for all similar purposes.

In certain applications of fluid fuel burning apparatus, for example in domestic water heaters, it is desirable to be able to place the apparatus in stand-by condition by manually interrupting fuel flow to the main burner without interfering with fuel flow to the pilot burner. Safety shut-off valves generally in use on such apparatus, provide 100 percent shut-off of the fuel flow on closure of the main burner fuel safety shut-off valve, and the present invention contemplates safety shut-off means in which the main burner fuel safety shut-off valve can be manually closed without interfering with the pilot fuel flow and without interfering with the safety operation of said safety shut-off means in response to pilot burner outage.

One of the main objects of the present invention therefore, is to provide in a flow control device having a main fuel control valve, a pilot fuel control valve, and releasable electromagnetic holding means for retaining such valves in open or flow-permitting positions, standby means for positioning said main valve in its flow-preventing position without thereby effecting closure of the pilot valve or release of the electromagnetic holding means.

A more specific object of the present invention is to provide in a safety shut-off device having electromagnetic holding means including a movable armature fixed to a first valve member and a movable elemtromagnet fixed to a second valve member, standby means for moving the safety shut-off device and valve members as a unit to afford interruption of the fuel flow controlled by one of said valve members, said electromagnets holding means being operable to provide 100 percent shutoff regardless of the position of said standby means.

Another main object of the present invention is to provide, in a single valve body, safety shut-off means for both main and pilot burners and manually operable valve means upstream of said safety shut-off means to afford interruption of fuel flow to both of said burners upstream of said safety shut-off means to thereby permit removal of the latter for purposes of repair without having to shut the fuel off at the meter.

Another more specific object of the present invention is to provide in a valve device of the character described having safety shut-off means for both of the main and pilot burners and plug valve means upstream thereof, standby means operable by actuation of operating means for said plug valve to interrupt fuel flow to the main burner, such actuation of the plug valve operating means positioning the plug valve to limit fuel flow therethrough.

Another more specific object of this invention is to provide cam interlock means between a plug valve and a safety shut-off valve for the main burner whereby movement of the operating means for such plug valve moves said safety shut-off valve to closed position, there being a pilot safety shut-off valve for termination of pilot fuel flow upon extinguishment of a pilot burner flame regardless of operation of said interlocking means.

Further objects and advantages and numerous adaptations of the invention will appear from the following detailed description taken in connection with the accompanying drawing showing one embodiment of the present invention, it being understood that the invention is limited only by the scope of the appended claims and not to the particular embodiment selected for illustration.

In the drawings:

Figure 1 is a sectional view taken substantially along the center line of a flow control device embodying the present invention, parts being broken away, and Figure 2 is a fragmentary plan view of the improved flow control device taken along the line 2—2 of Figure 1.

Like reference characters indicate corresponding parts throughout the several views of the drawings.

Referring to Figure 1, the numeral 10 designates a valve body formed with a tapered cavity 12 and a cylindrical cavity 14. Valve body 10 is also formed with an inlet chamber 16 formed with internal threads to afford connection of valve body 10 with a contiguous section of fluid fuel supply conduit 18. An intermediate opening 20, also formed in valve body 10, provides communication between cavities 12 and 14. A pilot fuel outlet chamber 22 is formed in valve body 10 with internal threads for connection of said valve body 10 to a pilot fuel supply conduit 24. A valve seat member 26 is threadably secured within an opening formed in valve body 10 at one end of cylindrical cavity 14 and is formed with a main outlet chamber 32 and with internal threads for connection thereof with a main burner fuel supply conduit 28. Valve seat member 26 is also formed with a valve seat 30.

Fluid fuel supply conduit 18 is connected to a source of fluid fuel (not shown), and main fuel supply conduit 28, as schematically shown in Figure 1, is connected to a main fluid fuel burner 34. Juxtaposed with respect to main burner 34, for ignition thereof as will hereinafter appear, is a pilot burner 36 connected to the pilot fuel supply conduit 24 as also schematically shown in Figure 1.

A plug valve member 38, having an exterior surface substantially complemental with respect to the tapered surface of cavity 12, is positioned therewithin as shown in Figure 1. Plug valve 38 is formed with a through opening or port 40 for registration with inlet chamber 16 and intermediate opening 20 to afford communication therebetween. Formed integrally therewith or secured to plug valve 38 in any desired manner is a valve stem 42 which extends through an opening 44a of a cover plate 44; the latter being fixed to valve body 10 in any desired manner such as by screws 45 shown in Figure 2. Interposed between plug valve 38 and cover plate 44 is a compression spring 46 which biases said plug valve 38 into firm seating engagement with the surface of the tapered cavity 12. An operating handle 48 is fixed to the valve stem 42 in any desired manner, such as by a set screw (not shown) and said handle is formed with a cam surface 48a for cooperation with a pin 50 as will hereinafter appear. Pin 50 is slidably positioned within an opening 51 formed in valve body 10 and within an opening 44b formed in cover plate 44. Gas tight sealing means such as packing 52 and washer 54 are held in contact with valve body 10 and pin 50 by means of a compression spring 56 interposed between said washer 54 and the cover plate 44.

Positioned within the cylindrical cavity 14 of valve body 10 is an electromagnetic holding device or coupling means comprising an enclosure 58 for a pair of coupling members which preferably take the form of an electromagnet core member 60 and an armature member 62. Electromagnet core member 60 is rigidly secured to an end wall of said enclosure by any desired means. A valve member 64 is rigidly secured to the exterior side of the same end wall of enclosure 58 and cooperates with the valve seat 30 to permit or prevent fuel flow to the main burner 34 as will hereinafter appear. Secured to the exterior side of the other end wall of enclosure 58 by any desired means is a back-up plate 66, and interposed between valve seat member 26 and back-up plate 66 is a compression spring 68 biasing the enclosure 58 and hence the valve member 64 away from the valve seat 30.

Armature member 62 is movable to attracted and retracted or coupled and uncoupled positions with respect to the core member 60; said armature member being fixed to a valve stem 70 which extends through an opening formed in the adjacent end wall of enclosure 58 and through an opening formed in back-up plate 66. Pivotally mounted on the outer end of the valve stem 70 is a pilot valve member 72 having flow-preventing and flow-permitting positions with respect to a pilot valve seat 74 formed in valve body 10 around the opening 22 therein. Pilot valve member 72 may be secured to valve stem 70 by means of a transverse pin which permits of relative movement between said valve member 72 and valve seat 74 to thereby insure firm seating engagement of the former about the entire periphery of the latter. A compression spring 76 is interposed between pilot valve member 72 and back-up plate 66 to bias the armature member 62 away from engagement with core member 60 and bias the pilot valve member 72 toward seating engagement with valve seat 74.

An electromagnet winding 78 is wound about the leg portions of U-shaped core member 60 and is provided with circuit connection means for connection thereof with an externally exposed contact member 80 insulatably positioned within an opening formed in the valve body 10. Contact member 80 is connected in circuit with a thermoelectric generator or thermocouple 82 positioned adjacent the pilot burner 36 and subject to the heat of the flame thereof for generation of electric current in response thereto.

A reset stem 84 is slidably positioned within an opening in valve body 10; said reset stem 84 having a transverse pin 86 to prevent removal of said stem from within such opening. Reset stem 84 is formed with an enlarged end portion 88, there being a compression spring 90 interposed between a washer 92 surrounding said stem and the enlarged end portion 88 to bias said stem outwardly toward the retracted position shown. Packing means 94 is interposed between washer 92 and valve body 10 to prevent escape of fluid fuel between stem 84 and valve body 10.

Within the cavity 14 an operating lever 96 has one end pivotally connected to a bearing pin 98. An intermediate portion of the lever 96 is positioned for engagement with the back-up plate 66 and said lever has a free end portion 96a for engagement with the inner end portion of pin 50.

Figure 2 of the drawings shows the relationship between the plug valve operating handle 48, port 40, cam surface 48 and pin 50. An arrow 100 or any other suitable mark is formed on the top of valve body 10 adjacent pin 50 and suitable indicia is affixed to the operating handle 48 to indicate, when aligned with the arrow 100 the "standby," "on" and "off" positions of the plug valve 38. Conversely, alignment of the appropriate indicium with the arrow 100 positions the subject flow control device in the corresponding position. That is, with "off" algined with indicating arrow 100, port 40 is out of alignment with inlet chamber 16 and fuel is thereby prevented from flowing through chamber 14 to either the main burner 34 or the pilot burner 36. In the "on" position of the operating handle 48, port 40 is aligned with inlet chamber 16 and intermediate opening 20 to permit fuel flow to both the main burner 34 and pilot burner 36 under the control of valves 64 and 72. In "standby" position port 40 is only partially aligned with chamber 16 and opening 20 wherefore only a reduced amount of fuel is permitted to flow into chamber 14. Also, in "standby" position, pin 50 is depressed by virtue of its having followed cam surface 48a of operating handle 48 during rotation of the latter from "on" to "standby" positions. The latter function will be hereinafter explained in greater detail.

The operation of the device shown in the drawings is as follows:

As aforementioned, when the operating handle 48 is in "off" position, plug valve 38 is so positioned that port 40 is out of alignment with inlet chamber 16 and intermediate opening 20, and all fuel flow is prevented through the improved control device. Since no flame exists at the pilot burner 36, thermocouple 82 is in its cooled condition, thus affording no energizing current to the electromagnetic winding 78. In the unenergized condition of the electromagnetic winding 78, the electromagnetic holding device is released and compression spring 76 biases the armature member 62 to its retracted position with respect to the pole faces of the electromagnet core member 60, thereby biasing the pilot valve member 72 to flow-preventing engagement with valve seat 74 and the main valve member 64 to flow-preventing engagement with main valve seat 30. It will be noted that compression spring 76 necessarily must have a greater spring force than compression spring 68 to retain both of valve members 64 and 72 in their flow-preventing positions.

In order to place the fluid fuel burning apparatus in operation, it is necessary to rotate operating handle 48 from its "off" position to its "on" position. In this position, it is merely necessary to depress reset button 88 sufficiently to move the armature member 62 into engagement with the pole faces of core member 60 and to thereafter move the core 60, enclosure 58 and valve member 64 against the bias of the spring 68 until the valve 64 sealingly engages the seat 30. This resetting movement simultaneously moves the valve member 72 to flow-permitting position to permit fluid fuel to flow through pilot outlet chamber 22 and pilot fuel supply conduit 24 to the pilot burner 36, whereupon the fuel emitted therefrom may be ignited in any desired manner. Closure of the valve member 64 during this ignition operation affords interruption of the flow of fuel to the main burner, insuring safe lighting. On ignition of the pilot burner 36, the flame thereof heats the hot junction of thermocouple 82 to provide an electric current flow for energization of electromagnetic winding 78. Energization of winding 78 affords a magnetic flux flow in the core member 60 and armature member 62, thus providing a magnetic attractive force therebetween sufficient to overcome the force of compression spring 76 and hold the armature 62 attracted to the core 60 and the valve 72 in flow-permitting position.

With armature member 62 thus held in attracted relation with respect to core member 60, release of reset button 88 permits the compression spring 68 to move the entire electromagnetic holding device and valve members 64 and 72 in an upward direction as viewed in Figure 1 to an operative position wherein the valves 64 and 72 are both in flow-permitting positions, i. e., spaced from the seats 30 and 74 respectively. The aforementioned operative position may be defined by the unstressed free length of the spring 68, or, where it is desired to use a longer spring 68 which is at all times compressed, said operative position is defined by coaction of the plate 66 with the lever 96. In the latter case, on release of the reset button 88 the bias of spring 68 causes plate 66 of the electromagnetic holding device to engage the lever 96 and rotate the latter in a clockwise direction about pin 98, whereupon pin 50 due to engagement thereof by the end portion 96a of lever 96, is moved to its projected position in abutting engagement with cam surface 48a. Such engagement between pin 50 and cam surface 48a prevents further clockwise movement of lever 96 and upward movement of the electromagnetic holding device to thereby define the operative position wherein both of valves 64 and 72 are brought to rest in their flow-permitting positions. Movement of valve member 64 to its flow-permitting position permits fluid fuel to flow from the cavity 14 through outlet chamber 32 and main fuel supply conduit 28 to the main burner 32, where the fuel emitted from the latter is ignited by the flame of pilot burner 36.

If it should be desired to place the fluid fuel burning apparatus in standby condition, that is, with the main burner flame extinguished and the pilot burner operative as shown in Figure 1, it is merely necessary to rotate the operating handle 48 to the "standby" position shown. Such movement causes pin 50 to follow the curved portion of cam surface 48a and engage the flat undersurface of the handle 48 whereby said pin 50 is forced in an inward direction to cause the lever 96 to be rotated in a counterclockwise direction about pin 98. During such movement the lever 96 engages the plate 66 to move the electromagnetic holding device in the downward direction as viewed in Figure 1 against the force of compression spring 68, thereby returning the valve member 64 into engagement with valve seat 30 and terminating fluid fuel flow to the main burner 34. Such movement, however, does not substantially effect the fluid fuel flow through conduit 24 to pilot burner 36.

If the pilot burner flame should be extinguished while the plug valve operating handle 48 is in "standby" position, compression spring 76 will return valve member 72 to seating engagement with valve seat 74 thus terminating fluid fuel flow to pilot burner 36. It is thus seen that the aforedescribed standby mechanism is completely independent of the reset means for the electromagnetic device and provides the safety feature of 100% fuel shut-off upon pilot flame extinguishment.

It will also be noted that the improved device is preferably so constructed that movement of the operating handle from its "on" position to its "standby" position removes port 40 from complete alignment with inlet chamber 16 to only partial alignment therewith. Such feature is very desirable in that it provides a decreased fuel flow to cavity 14 while in standby position, which flow is sufficient to maintain only the pilot burner 36 in operating condition. It is also within the inventive concept, however, to not so restrict the fuel flow through the port 40 when the device is in "standby" position.

In order to terminate fuel flow to both the main and pilot burners, it is merely necessary to rotate operating handle 48 to its "off" position, thereby terminating all fuel flow to the cavity 14 and to the burners 34 and 36, and again positioning the cam surface 48a in registry with the pin 50, whereupon the bias of the spring 68, acting through the plate 66 and lever 96, moves the pin 50 outwardly to its projected position which may be in engagement with said cam surface. On subsequent cooling of the thermocouple 82, the coil 78 is deenergized and the electromagnetic holding device is released, the valve members 64 and 72 being thereupon biased to flow-preventing position by the spring 76.

When the plug valve 38 is in "off" position, the valve seat member 26 may be threadably removed from within the valve body 10 without any danger of fluid fuel escaping to the surrounding atmosphere. Such removal of valve seat member 26, of course, permits removal of the electromagnetic holding device, valve members 64 and 72 and associated parts for the purpose of repair or replacement.

Although I have shown and described certain specific embodiments of my invention, I am fully aware that many modifications thereof are possible. The present invention, therefore, is not to be restricted except insofar as is necessitated by the prior art and by the spirit of the appended claims.

I claim:

1. Control apparatus comprising first and second control members each having first and second operating positions, releasable coupling means including first and second coupling members operatively associated respectively with said first and second control members, first biasing means biasing said coupling members toward released position and said control members toward their first positions, said coupling members being normally held in coupled position and at least one of said control members being thereby moved to its second position by movement of said coupling members to coupled position against said bias, second biasing means operatively associated with said coupling members when coupled to effect disposition of both of said control members in their second positions, and actuating means operatively associated with at least one of said coupling members for actuating said coupled members as a unit against the bias of said second biasing means to thereby position one of said control members in its first position while maintaining the other of said control members in its second position but nevertheless leaving said coupled members free for movement under the bias of said first biasing means.

2. Flow control apparatus comprising first and second flow control members each having flow-permitting and flow-preventing positions, releasable coupling means including first and second coupling members operatively connected respectively to said first and second flow control members, first biasing means biasing said coupling members toward released position and said control members toward their flow-preventing positions, said coupling members being normally held in coupled position and at least one of said flow control members being thereby moved to its flow-permitting position by disposition of said coupling members in their coupled position against said bias, means including second biasing means operatively associated with said coupling members when coupled to effect disposition of both of said control members in their flow-permitting positions, and actuating means operatively associated with at least one of said coupling members for actuating said coupled members against the bias of said second biasing means to thereby position one of said control members in its flow-preventing position while maintaining the other control member in its flow-permitting position but nevertheless leaving said coupled members free for movement toward their released position under the bias of said first biasing means.

3. Fluid flow control apparatus comprising, first and second fluid passages, first and second valve members each having flow-permitting and flow-preventing positions in said first and second passages respectively, releasable coupling means including first and second coupling members operatively connected respectively with said first and second valve members, first biasing means biasing said coupling members toward released position and said valve members toward their flow-preventing positions, said coupling members being normally held in coupled position and said first valve member being thereby moved to its flow-permitting position by movement of said coupling members to coupled position against said bias to permit fluid flow in said first fluid passage, means including second biasing means operatively associated with said coupling members when coupled to move said second valve member to its flow-permitting position while maintaining said first valve member in its flow-permitting position to permit fluid flow in both of said first and second fluid passages, and actuating means operatively associated with at least one of said coupling members for actuating said coupled members against the bias of said second biasing means to thereby position said second valve member in its flow-preventing position to prevent fluid flow in said second fluid passage while permitting flow in said first fluid passage while permitting releasing movement of said coupled members to thereby position the first valve member in its flow-preventing position.

4. Fluid flow control apparatus comprising, first and second fluid passages, first and second valve members each having flow-permitting and flow-preventing positions in said first and second passages respectively, releasable electromagnetic coupling means including a core member and an armature member operatively connected respectively with said first and second valve members, said coupling means including an energizable winding on said core member, first biasing means biasing said coupling members toward released position and said valve members toward their flow-preventing positions, said winding being normally energized to hold said core and armature members in coupled position and one of said valve members being thereby moved to its flow-permitting position by disposition of said coupling members in their coupled position against said bias, means including second biasing means operatively associated with said coupling members when coupled to move the other of said valve members to its flow-permitting position while maintaining said one of said valve members in its flow-permitting position, and actuating means operatively associated with said core and armature members when coupled for actuating said coupled members against the bias of said second biasing means to thereby position one of said valve members in its flow-preventing position while maintaining the other valve member in its flow-permitting position but nevertheless leaving the core and armature free for releasing movement should the winding become deenergized.

5. Control apparatus comprising, first and second control members each having first and second operating positions, an electromagnet and armature therefor operatively associated respectively with said first and second control members, reset means for effecting positioning of said electro-magnet and armature in attracted relation and movement of one of said control members from its first toward its second operating position, first biasing means operable upon release of said reset means during energization of said electromagnet to effect movement of electromagnet and armature as a unit and movement of the other of said control members from its first toward its second operating position, lever means operable independently of said reset means to overcome said first biasing means to maintain said other control member in its first operating position, and second biasing means operable independently of said lever means upon deenergization of said electromagnet to effect retractive movement of said electromagnet and armature to position both of said control members in their first operating positions.

6. Control apparatus comprising, first and second control members each having first and second operating positions, an electromagnet and armature therefor operatively associated respectively with said first and second control members, reset means for effecting positioning of said electromagnet and armature in attracted relation and movement of one of said control members from its first toward its second operating position, first biasing means operable upon release of said reset means during energization of said electromagnet to effect movement of said electromagnet and armature as a unit and the other of said control members from its first toward its second operating position, lever means operable independently of said reset means while both of said control members are in their second operating positions to overcome said first biasing means to move the other of said control members to its first operating position while maintaining said one of said control members in its second operating position, and second biasing means operable independently of said lever means upon deenergization of said electromagnet to effect retractive movement of said electromagnet and armature to position both of said control members in their first operating positions.

7. Control apparatus comprising, first and second control members each having first and second operating positions, an electromagnet and armature therefor operatively associated respectively with said first and second control members, reset means for effecting positioning of said electromagnet and armature in attracted relation and movement of one of said control members from its first toward its second operating position, first biasing means operable upon release of said reset means during energization of said electromagnet to effect movement of said electromagnet and armature as a unit to move the other of said control members from its first toward its second operating position, lever means manually operable independently of said reset means to overcome said first biasing means to prevent movement of said other control member to its second operating position, the flow controlling action of said one of said control members being substantially unaffected by said lever means, and second biasing means operable independently of said lever means upon deenergization of said electromagnet to effect retractive movement of said electromagnet and armature, to position both of said control members in their first operating positions.

8. Control apparatus comprising, first and second fluid flow control members each having flow-permitting and flow-preventing positions, an electromagnet and armature therefor operatively associated with said first and second control members, reset means for effecting positioning of said electromagnet and armature in attracted relation and movement of said first control member from its flow-preventing to its flow-permitting position, first biasing means operable upon retraction of said reset means during energization of said electromagnet to move said electromagnet and armature as a unit and thereby move said second control member from its flow-preventing to its flow-permitting position, lever means operable as desired to overcome said first biasing means to position said second control member in its flow-preventing position independently of said reset means and the position of said first control member, and second biasing means operable independently of said lever means upon deenergization of said electromagnet to effect retractive movement of said electromagnet and armature and to position both of said control members in their flow-preventing positions.

9. Fluid flow control apparatus comprising, first and second fluid flow control valves each having flow-permitting and flow-preventing positions, an electromagnet and armature therefor operatively associated with said control valves, manually operable reset means for positioning said electromagnet and armature in attracted relation and moving said first control valve from its flow-preventing position to its flow-permitting position, first biasing means operable upon release of said reset means during energization of said electromagnet to move said electromagnet and armature as a unit to thereby move said second valve from its flow-preventing position to its flow-permitting position, manually operable lever means operable independently of said reset means to overcome said first biasing means to maintain said second valve in its flow-preventing position, and second biasing means operable independently of said lever means upon deenergization of said electromagnet to effect retractive movement of said electromagnet and armature to thereby position both of said valves in their flow-preventing positions.

10. Control apparatus, comprising, first and second fluid passages, first and second control members each having first and second controlling positions in said first and second fluid passages respectively, an electromagnet and armature therefor operatively associated respectively with said first and second control members, reset means for effecting positioning of said electromagnet and armature in attracted relation and movement of one of said control members from its first toward its second controlling position, first biasing means operable upon release of said reset means during energization of said electromagnet to effect movement of said electromagnet and said armature as a unit and the other of said control members from its first towards its second controlling position, positioning means for overcalling said first biasing means to effect movement of said other control member to its first controlling position and to maintain said one control member in its second controlling position provided said electromagnet remains energized in its second biasing means operable upon deenergization of said electromagnet to effect retractive movement of said electromagnet and armature to position both the said control members in their first operating positions, and flow control means having flow-permitting and flow-preventing positions with respect to both of said fluid passages upstream of said control members whereby said control members and associated parts may be removed for repair and replacement whenever said flow control means is in its flow-preventing position.

11. Control apparatus, comprising, first and second fluid passages, first and second control members each having first and second controlling positions in said first and second fluid passages respectively, an electromagnet and armature therefor operatively associated respectively with said first and second control members, reset means for effecting positioning of said electromagnet and armature in attracting relation and movement of one of said control members from its first toward its second controlling position, first biasing means operable upon release of reset means during energization of said electromagnet to effect movement of said electromagnet and said armature as a unit and the other of said control members from its first towards its second controlling position, positioning means for overcalling said first biasing means to effect movement of said other control member to its first controlling position and to maintain said one control member in its second controlling position provided said electromagnet remains energized in its second biasing means operable upon deenergization of said electromagnet to effect retractive movement of said electromagnet and armature to position both of said control members in their first operating positions, and a manually rotatable plug valve having flow-permitting and flow-preventing positions with respect to both of said fluid passages upstream of said control members whereby said control members and associated parts may be removed for repair and replacement whenever said plug valve is rotated into its flow-preventing position.

12. Control apparatus comprising, first and second fluid passages, first and second control members each having first and second controlling positions in said first and second fluid passages respectively, an electromagnet and armature therefor operatively associated respectively with said first and second control members, reset means for effecting positioning of said electromagnet and armature in attracted relation and movement of one of said control members from its first toward its second controlling position, first biasing means operable upon release of said reset means during energization of said electromagnet to effect movement of said electromagnet and said armature as a unit and the other of said control members from its first toward its second controlling position, flow control means including operating means therefor for control of fluid flow through both of said passages upstream of said control members, lever means operatively associated with the operating means for said flow control means to overcome said first biasing means and maintain the other of said control members in its first operating position independently of said reset means, and second biasing means operable independently of said lever means upon deenergization of said electromagnet to effect retractive movement of said electromagnet and armature to thereby position both of said control members in their first operating positions.

13. Control apparatus comprising, first and second fluid passages, first and second control members each having first and second controlling positions in said first and second fluid passages respectively, an electromagnet and armature therefor operatively associated respectively with said first and second control members, reset means for effecting positioning of said electromagnet and armature in attracted relation and movement of one of said control members from its first toward its second controlling position, first biasing means operable upon release of said reset means during energization of said electromagnet to effect movement of said electromagnet and armature as a unit and the other of said control members from its first toward its second controlling position, flow control means for said passages upstream of said control members, manual operating means for said flow control means movable in a predetermined manner to afford variation of the fluid flow in said passages, lever means associated with said operating means to overcome said first biasing means by movement of said operating means in said predetermined manner to thereby maintain said other control member in its first operating position independently of said reset means, and second biasing means operable independently of said lever means upon deenergization of said electromagnet to effect retractive movement of said electromagnet and armature to thereby position both of said control members in their first operating positions.

14. Fluid flow control apparatus comprising, a valve body formed with an inlet passage and first and second outlet passages in communication with said inlet passage, first and second valve members each having flow-permitting and flow-preventing positions in said first and second outlet passages respectively, an electromagnet and armature therefor operatively associated respectively with said first and second valve members, manual reset means for positioning said electromagnet and armature in attracted relation and for moving one of said valve members from its flow-preventing to its flow-permitting position, first biasing means operable upon release of said reset means during energization of said electromagnet to effect movement of said electromagnet and said armature as a unit to thereby move the other of said valve members from its flow-preventing to its flow-permitting position, a rotatable plug valve in said inlet passage for control of fluid flow through both of said outlet passages, rotatable operating means for said plug valve for variation of fluid flow through said outlet passages, cam means on said operating means, lever means associated with said cam means and operable independently of said reset means by rotation of said plug valve operating means to overcome said first biasing means for maintaining said second valve member in its flow-preventing position, and second biasing means operable independently of said lever means upon deenergization of said electromagnet to effect retractive movement of said electromagnet and armature to thereby position both of said valve members in their flow-preventing positions, said valve members and associated parts being removable for repair and replacement whenever said plug valve is positioned to prevent fluid flow through said inlet passage.

15. Control apparatus comprising first and second control members each having first and second operating positions, first and second coupling members operatively associated respectively with said first and second control members, means for effecting coupling of said coupling members and movement of one of said control members from its first toward its second operating position, first biasing means operable upon coupling of said coupling members to effect movement thereof as a unit and movement of the other of said control members from its first toward its second operating position, means independent of said coupling means operable to overcome said first biasing means to maintain said other control member in its first operating position, and second biasing means operable independently of said last named means to position both of said control members in their first operating positions upon uncoupling of said coupling members.

16. Control apparatus comprising first and second control members each having first and second operating positions, electromagnetic coupling means comprising first and second electromagnetic members operatively associated respectively with said first and second control members, reset means for effecting positioning of said magnetic members in coupled position and movement of one of said control members from its first toward its second operating position, first biasing means operable upon release of said reset means during energization of said electromagnet members to effect movement of said coupling means as a unit and the other of said control members from its first toward its second operating position, means operable independently of said reset means to overcome said first biasing means to move the other of said control members to its first operating position while maintaining said one of said control members in its second operating position and second biasing means operable independently of said last named means upon deenergization of said electromagnetic coupling means to effect uncoupling of said electromagnetic members to position both of said control members in their first operating positions.

17. Control apparatus comprising first and second control members each having a first and movable to a second operating position, coupling means including first and second coupling members movable between coupled and uncoupled positions and operatively associated with said first and second control members, said coupling members when in coupled relation normally effecting positioning of said control members in their second operating position and when in uncoupled relation effecting positioning of said control members in their first operating position, and actuating means operatively associated with at least one of said coupling members for actuating said coupled members as a unit to position one of said control members in its first position while nevertheless maintaining said coupling members coupled and the other control member in its second position.

18. Control apparatus comprising, first and second control members each having first and second operating positions, an electromagnet and armature therefor operatively associated with said first and second control members, reset means for effecting positioning of said electromagnet and armature in attracted relation and movement of one of said control members from its first toward its second operating position, first biasing means operable upon release of said reset means during energization of said electromagnet to effect movement of the other of said control members from its first toward its second operating position, lever means operable to overcome said first biasing means to maintain said other control member in its first operating position, and second biasing means operable independently of said lever means upon deenergization of said electromagnet to effect retractive movement of said electromagnet and armature to position both of said control members in their first operating positions.

19. Control apparatus comprising, first and second control members each having first and second operating positions, an electromagnet and armature therefor operatively associated with said first and second control members, reset means for effecting positioning of said electromagnet and armature in attracted relation and movement of one of said control members from its first toward its second operating position, first biasing means operable upon release of said reset means during energization of said electromagnet to effect movement of the other of said control members from its first toward its second operating position, positioning means operable to overcome said first biasing means to maintain said other control member in its first operating position, and second biasing means operable independently of said positioning means upon deenergization of said electromagnet to effect retractive movement of said electromagnet and armature to position both of said control members in their first operating positions.

20. Control apparatus comprising, first and second control members each having first and second operating positions, an electromagnet and armature therefor operatively associated with said first and second control members, reset means for effecting positioning of said electromagnet and armature in attracted relation and movement of one of said control members from its first toward its second operating position, first biasing means operable upon release of said reset means during energization of said electromagnet to effect movement of the other of said control members from its first toward its second operating position, positioning means operable following resetting of said electromagnet and armature to overcome said first biasing means to maintain said other control member in its first operating position, and second biasing means operable upon deenergization of said electromagnet during maintenance of said other control member in its first operating position by said positioning means to effect retractive movement of said electromagnet and armature to position both of said control members in their first operating positions.

References Cited in the file of this patent

UNITED STATES PATENTS

| 2,658,515 | Jackson | Nov. 10, 1953 |
| 2,674,255 | Biggle | Apr. 6, 1954 |